(12) United States Patent
Okajima et al.

(10) Patent No.: US 9,328,026 B2
(45) Date of Patent: May 3, 2016

(54) METHOD FOR MANUFACTURING CERAMIC ELECTRONIC COMPONENT, AND CERAMIC ELECTRONIC COMPONENT

(71) Applicant: Murata Manufacturing Co., Ltd., Nagaokakyo-shi, Kyoto-fu (JP)

(72) Inventors: Kenichi Okajima, Nagaokakyo (JP); Daiki Fukunaga, Nagaokakyo (JP); Takayuki Yao, Nagaokakyo (JP); Yasunari Nakamura, Nagaokakyo (JP); Akihiro Shiota, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 202 days.

(21) Appl. No.: 14/140,741

(22) Filed: Dec. 26, 2013

(65) Prior Publication Data

US 2014/0185185 A1 Jul. 3, 2014

(30) Foreign Application Priority Data

Dec. 28, 2012 (JP) .................. 2012-288208
Oct. 1, 2013 (JP) .................. 2013-206147

(51) Int. Cl.
*C04B 37/00* (2006.01)
*H01G 4/30* (2006.01)
*H01G 4/12* (2006.01)
*B32B 18/00* (2006.01)

(52) U.S. Cl.
CPC ............... *C04B 37/001* (2013.01); *B32B 18/00* (2013.01); *H01G 4/1227* (2013.01); *H01G 4/1281* (2013.01); *H01G 4/30* (2013.01); *C04B 2237/346* (2013.01); *C04B 2237/58* (2013.01); *C04B 2237/704* (2013.01); *C04B 2237/80* (2013.01); *Y10T 29/43* (2015.01)

(58) Field of Classification Search
CPC ..... H01G 4/30; H01G 4/1281; H01G 4/1227; C04B 37/001
See application file for complete search history.

(56) References Cited

U.S. PATENT DOCUMENTS

| 4,771,520 A | 9/1988 | Tanaka et al. |
| 2008/0304204 A1 | 12/2008 | Suzuki |
| 2012/0073129 A1 | 3/2012 | Abe et al. |

(Continued)

FOREIGN PATENT DOCUMENTS

| JP | 61-248413 A | 11/1986 |
| JP | 06349669 A * | 12/1994 |

(Continued)

OTHER PUBLICATIONS

Official Communication issued in corresponding Korean Patent Application No. 10-2013-0163796, mailed on Jan. 29, 2015.

(Continued)

*Primary Examiner* — David M Sinclair
(74) *Attorney, Agent, or Firm* — Keating & Bennett, LLP (57) ABSTRACT

A raw ceramic portion is formed on each of first and second lateral surfaces of a raw ceramic body. The raw ceramic portions contain ceramic particles and more of at least one constituent selected from Ba, Mg, Mn, and a rare-earth element between the ceramic particles than the ceramic section of the raw ceramic body in terms of total amount. The raw ceramic body is fired with the raw ceramic portions thereon. In this way, a ceramic electronic component is obtained that has a main body left after the raw ceramic body is fired with the raw ceramic portions thereon.

20 Claims, 7 Drawing Sheets

(56) References Cited

U.S. PATENT DOCUMENTS

| | | | |
|---|---|---|---|
| 2012/0229950 A1* | 9/2012 | Kim | H01G 4/005 361/321.2 |
| 2012/0234462 A1 | 9/2012 | Matsui et al. | |
| 2012/0250220 A1* | 10/2012 | Yamashita | H01G 4/005 361/321.2 |
| 2012/0307418 A1* | 12/2012 | Kim | H01G 4/30 361/321.2 |
| 2013/0276955 A1 | 10/2013 | Matsui et al. | |

FOREIGN PATENT DOCUMENTS

| | | | |
|---|---|---|---|
| JP | 2009-16796 A | 1/2009 | |
| JP | 2010-50263 A | 3/2010 | |
| JP | 2012-94819 A | 5/2012 | |
| JP | 4930609 B2 | 5/2012 | |
| JP | 2012-209538 A | 10/2012 | |
| JP | 2012-209539 A | 10/2012 | |
| WO | WO 2011071146 A1 * | 6/2011 | H01G 4/012 |

OTHER PUBLICATIONS

Official Communication issued in corresponding Japanese Patent Application No. 2013-206147, mailed on Nov. 24, 2015.

* cited by examiner

FIG. 11

METHOD FOR MANUFACTURING CERAMIC ELECTRONIC COMPONENT, AND CERAMIC ELECTRONIC COMPONENT

BACKGROUND OF THE INVENTION

1. Field of the Invention

The present invention relates to a method for manufacturing a ceramic electronic component and to a ceramic electronic component.

2. Description of the Related Art

In recent years, electronic devices such as cellular phones and mobile music players have been getting smaller in size. Accordingly, ceramic electronic components for electronic devices, such as multilayer ceramic capacitors, have been rapidly getting larger in capacitance and smaller in size.

An effective way to increase the capacitance of a multilayer ceramic capacitor is to increase the area where the two sets of inner electrodes face each other. However, maximizing the area where the inner electrodes face each other accordingly increases the dimensions of the multilayer ceramic capacitor. To combine a small size and a large capacitance, therefore, it is required to maximize the area where the inner electrodes are opposite to each other while minimizing the area of the rest. An example of a method that produces a multilayer ceramic capacitor while maximizing the area where the inner electrodes face each other and minimizing the remaining area can be found in Japanese Unexamined Patent Application Publication No. 61-248413. In this method, a ceramic body is prepared that has first and second lateral surfaces and contains first and second inner electrodes exposed on the first and second lateral surfaces, respectively, and then a ceramic layer is formed on each lateral surface of the ceramic body.

However, the method described in Japanese Unexamined Patent Application Publication No. 61-248413 is disadvantageous in that the inner electrodes, which are exposed on the lateral surfaces, are likely to short-circuit.

SUMMARY OF THE INVENTION

Preferred embodiments of the present invention provide a method for manufacturing a ceramic electronic component and a ceramic electronic component with significantly reduced risk of short-circuiting between inner electrodes.

According to a preferred embodiment of the present invention, in a method for manufacturing a ceramic electronic component, a raw ceramic body is first prepared. The raw ceramic body includes first and second main surfaces that extend in the length and width directions, first and second lateral surfaces that extend in the length and thickness directions, first and second end surfaces that extend in the width and thickness directions, a first inner electrode exposed at the first end surface and the first and second lateral surfaces, and a second inner electrode exposed at the second end surface and the first and second lateral surfaces. The first and second inner electrodes face each other in the thickness direction with a ceramic section located therebetween. The ceramic section contains ceramic particles and at least one constituent selected from Ba, Mg, Mn, and a rare-earth element located between the ceramic particles. A raw ceramic portion is then formed on each of the first and second lateral surfaces of the raw ceramic body. The raw ceramic portions contain ceramic particles and more of the total amount content of the at least one constituent selected from Ba, Mg, Mn, and a rare-earth element located between the ceramic particles in the raw ceramic portions than that in the ceramic section. The raw ceramic body is then fired with the raw ceramic portions provided thereon. The obtained ceramic electronic component includes an electronic component body left after the raw ceramic body is fired with the raw ceramic portions provided thereon.

In a specific preferred embodiment of the method for manufacturing a ceramic electronic component according to this aspect of the present invention, the at least one constituent is a rare-earth element.

In another specific preferred embodiment of the method for manufacturing a ceramic electronic component according to this aspect of the present invention, the at least one constituent is selected from a Ba-containing compound, a Mg-containing compound, a Mn-containing compound, and a compound containing a rare-earth element.

In another specific preferred embodiment of the method for manufacturing a ceramic electronic component according to this aspect of the present invention, each of the raw ceramic portions is formed by attaching a ceramic green sheet.

In another specific preferred embodiment of the method for manufacturing a ceramic electronic component according to this aspect of the present invention, each of the raw ceramic portions is formed by applying a ceramic paste.

According to another preferred embodiment of the present invention, a ceramic electronic component includes a ceramic body, a first inner electrode, and a second inner electrode. The ceramic body includes first and second main surfaces that extend in the length and width directions, first and second lateral surfaces that extend in the length and thickness directions, first and second end surfaces that extend in the width and thickness directions and contains ceramic particles and at least one constituent selected from Ba, Mg, Mn, and a rare-earth element located between the ceramic particles. The first inner electrode extends in the ceramic body in the length and width directions and is exposed at the first end surface, while the second inner electrode extends in the ceramic body in the length and width directions and is exposed at the second end surface. The first and second inner electrodes surface each other in the thickness direction with a ceramic section located therebetween. The end portions of the ceramic section, which is located between the first inner electrode and the second inner electrode, in the width direction contain more of the total amount content of the at least one constituent selected from Ba, Mg, Mn, and a rare-earth element contained in a compound present between the ceramic particles than that in a middle portion of the ceramic body in the width direction.

In a specific preferred embodiment of the ceramic electronic component according to this aspect of the present invention, the total amount content of the at least one constituent selected from Ba, Mg, Mn, and a rare-earth element gradually decreases from the outer side portion of the ceramic body toward the inner side portion of the ceramic body.

In another specific preferred embodiment of the ceramic electronic component according to this aspect of the present invention, the at least one constituent is a rare-earth element.

In another specific preferred embodiment of the ceramic electronic component according to this aspect of the present invention, the end portions of the first inner electrode in the width direction are located in the same or substantially the same positions in the width direction as those of the second inner electrode in the width direction.

In another specific preferred embodiment of the ceramic electronic component according to this aspect of the present invention, the ceramic particles in the ceramic section are made of a perovskite compound that contains Ba and Ti or a perovskite compound that contains Ba, Ti, and Ca.

In another specific preferred embodiment of the ceramic electronic component according to this aspect of the present invention, the at least one constituent is selected from a Ba-containing compound, a Mg-containing compound, a Mn-containing compound, and a compound that contains a rare-earth element.

In another specific preferred embodiment of the ceramic electronic component according to this aspect of the present invention, the end portion of the region defined by the first and second inner electrodes on the first lateral surface side in the width direction is at a distance of about 2 μm to about 30 μm from the first lateral surface, and that on the second lateral surface side is at a distance of about 2 μm to about 30 μm from the second lateral surface.

In another specific preferred embodiment of the ceramic electronic component according to this aspect of the present invention, the ceramic section has a thickness of about 0.4 μm to about 0.8 μm.

Various preferred embodiments of the present invention provide a method for manufacturing a ceramic electronic component and a ceramic electronic component with significantly reduced risk of short-circuiting between inner electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes preferred embodiments of the present invention. The following preferred embodiments are for illustration purposes only and do not limit the scope of the present invention.

In the drawings referenced hereinafter members having the same or substantially the same function are denoted by the same reference numerals. These drawings are all schematic diagrams; the relative dimensions and other attributes of the illustrated things may be different from the reality, and may differ even from drawing to drawing. The following description should be considered in determining the realistic relative dimensions and other attributes of these things.

Preferred Embodiment 1

Figure 1:
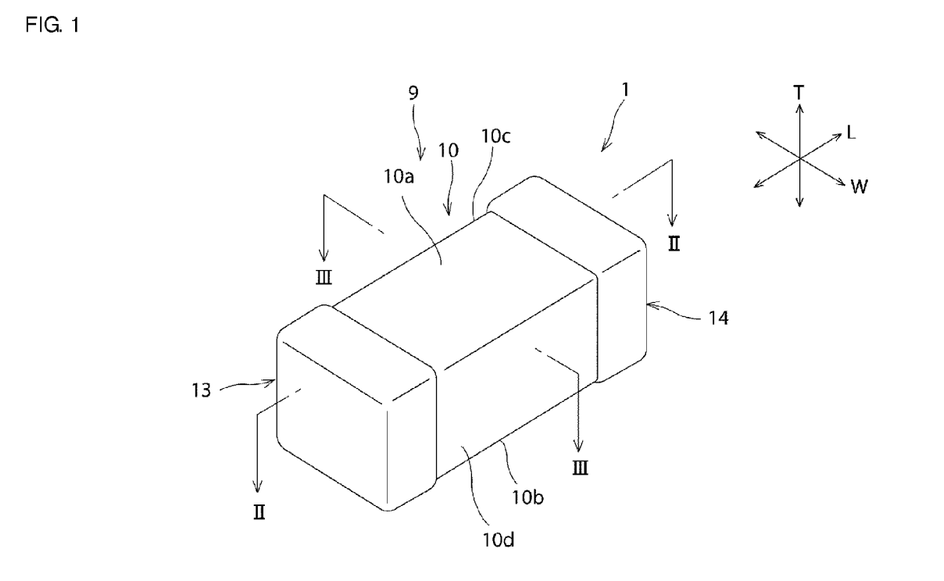
FIG. 1 is a schematic perspective view of a multilayer ceramic electronic component according to Preferred Embodiment 1 of the present invention.
Figure 2:
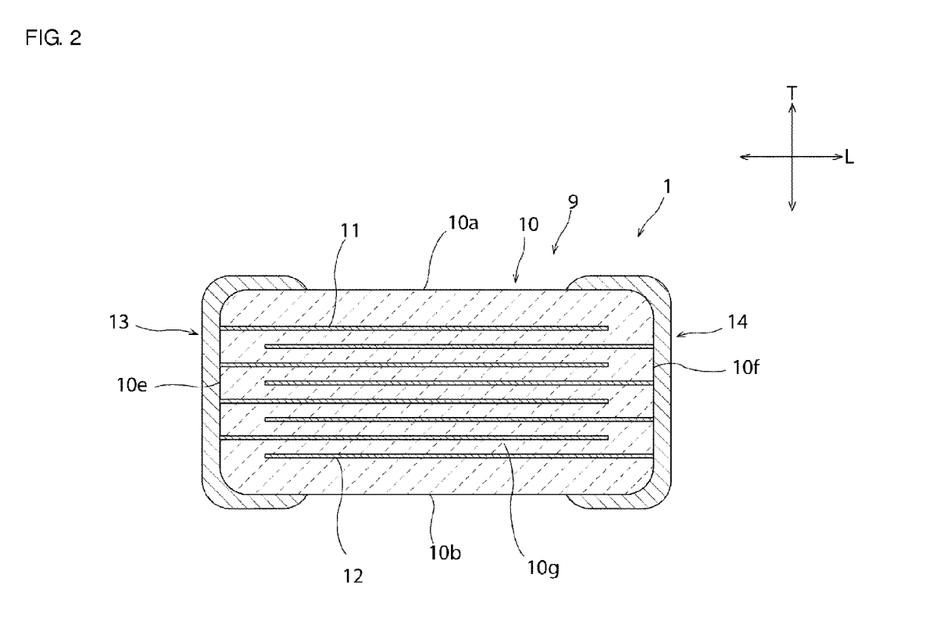
FIG. 2 is a schematic cross-sectional view taken along line II-II of FIG. 1.
Figure 3:
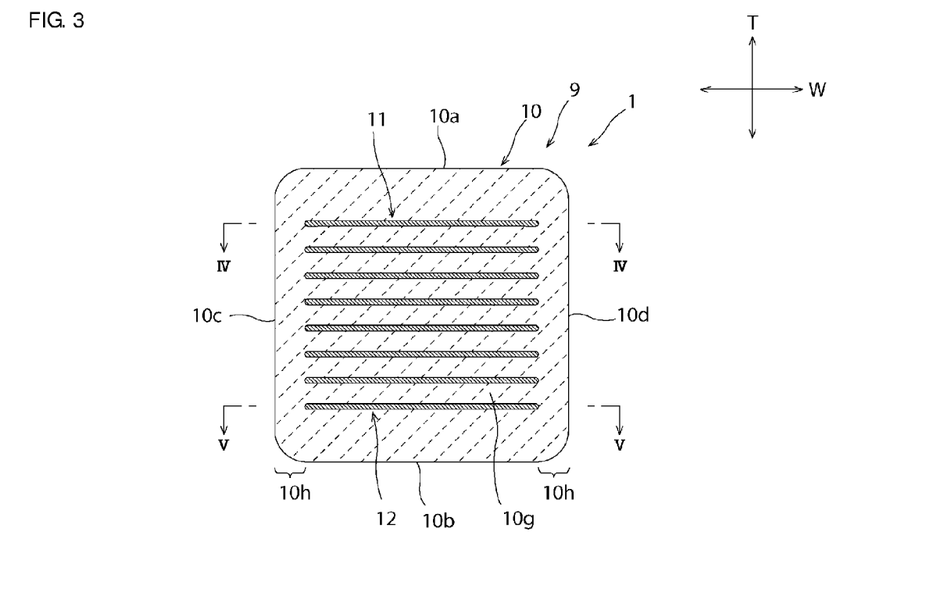
FIG. 3 is a schematic cross-sectional view taken along line III-III of FIG. 1.
Figure 4:
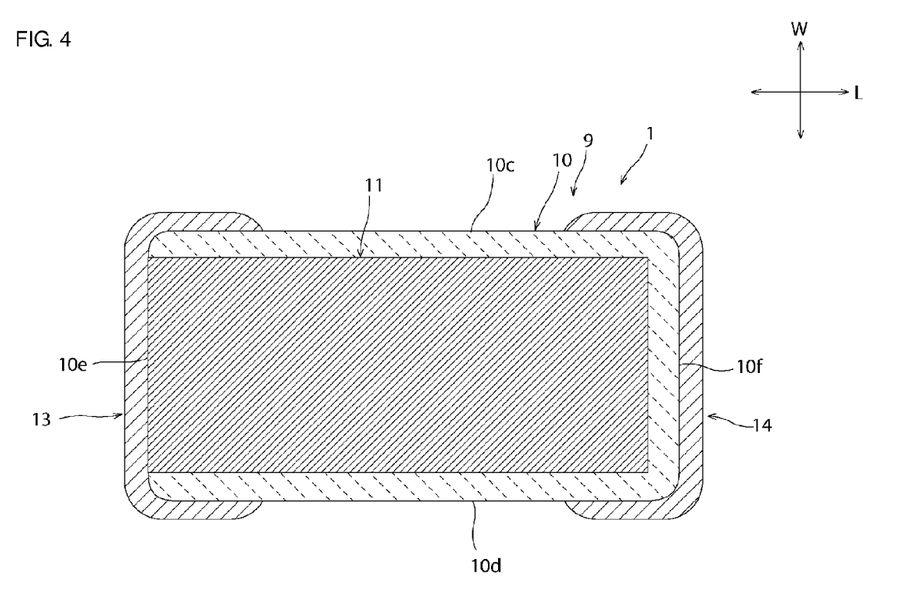
FIG. 4 is a schematic cross-sectional view taken along line IV-IV of FIG. 3.
Figure 5:
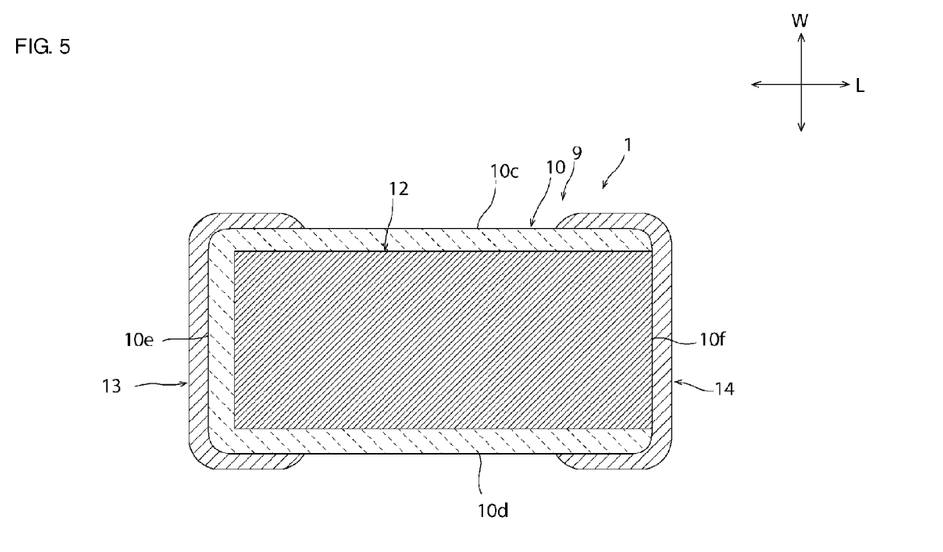
FIG. 5 is a schematic cross-sectional view taken along line V-V of FIG. 3.

FIG. 1 is a schematic perspective view of a multilayer ceramic electronic component according to Preferred Embodiment 1. FIGS. 2 and 3 are schematic cross-sectional views taken along lines II-II and III-III, respectively, of FIG. 1. FIGS. 4 and 5 are schematic cross-sectional views taken along line IV-IV and V-V, respectively, of FIG. 3.

The following describes the structure of a multilayer ceramic electronic component 1 manufactured in this preferred embodiment with reference to FIGS. 1 to 5.

As illustrated in FIGS. 1 to 3, the multilayer ceramic electronic component 1 has a substantially cuboid ceramic body 10. The ceramic body 10 includes first and second main surfaces 10a and 10b, first and second lateral surfaces 10c and 10d (see FIGS. 3 and 4), and first and second end surfaces 10e and 10f (see FIGS. 2, 4, and 5). The first and second main surfaces 10a and 10b extend in the length and width directions L and W. The first and second lateral surfaces 10c and 10d extend in the thickness and length directions T and L. The first and second end surfaces 10e and 10f extend in the width and thickness directions T and W.

The term substantially cuboid, as used herein, includes cuboids that have rounded edges and/or corners. Substantially cuboid members therefore include all members that have first and second main surfaces, first and second lateral surfaces, and first and second end surfaces. The main, lateral, and end surfaces may have some different features; for example, some or all of these surfaces may be rough.

The ceramic body 10 can have any dimensions. For example, the thickness, length, and width of the ceramic body 10 are preferably on the order of about 0.2 mm to about 0.5 mm, on the order of about 0.4 mm to about 1.0 mm, and about 0.2 mm to about 0.5 mm, respectively.

The ceramic body 10 contains ceramic particles and at least one constituent selected from Ba, Mg, Mn, and a rare-earth element located between the ceramic particles. Preferably, the ceramic particles are core-shell ceramic particles so that the constituent(s) between the ceramic particles becomes more effective in limiting the growth of the ceramic particles.

The constituent(s) selected from Ba, Mg, Mn, and a rare-earth element exists "substantially" between the ceramic particles; the constituent(s) may be partially dissolved in the ceramic particles.

The rare-earth element can be of any kind. Examples include Gd, Tb, Dy, Ho, Er, Tm, Yb, and Y.

The ceramic material used to form the ceramic body 10 can be of any kind and can be selected in accordance with the desired characteristics of the multilayer ceramic electronic component 1.

For example, when the multilayer ceramic electronic component 1 is a capacitor, the ceramic body 10 can be made of a dielectric ceramic material. Specific examples of dielectric ceramic materials include perovskite compounds that contain Ba and Ti and perovskite compounds that contain Ba, Ti, and Ca.

The constituent(s) that limits the growth of the ceramic particles in the ceramic body 10 can be of any kind. Preferably, this constituent(s) is selected from a Ba-containing compound, a Mg-containing compound, a Mn-containing compound, and a compound that contains a rare-earth element.

The constituent(s) selected from Ba, Mg, Mn, and a rare-earth element works against the growth of ceramic particles. In general, Ba, Mg, Mn, and rare-earth elements, while in a ceramic material, lower the potential energy between the ceramic particles contained and stabilize the ceramic material more effectively by existing between the particles than by dissolving in the particles and growing the particles. The constituent(s) selected from Ba, Mg, Mn, and a rare-earth element in this preferred embodiment therefore slows the growth of ceramic particles when existing between the ceramic particles. Note that the constituent(s) selected from Ba, Mg, Mn, and a rare-earth element exists "substantially" between the particles; a relatively small amount of the constituent(s) may be dissolved in the particles.

As illustrated in FIGS. 2 and 3, the ceramic body 10 includes several first inner electrodes 11 and several second inner electrodes 12.

The first inner electrodes 11 preferably are rectangular or substantially rectangular. The first inner electrodes 11 preferably are parallel or substantially parallel to the first and second main surfaces 10a and 10b; the first inner electrodes 11 extend in or substantially in the length and width directions L and W. The first inner electrodes 11 are exposed or substantially exposed at the first end surface 10e and not at the first and second main surfaces 10a and 10b, the first and second lateral surfaces 10c and 10d, and the second end surface 10f.

Likewise, the second inner electrodes 12 preferably are rectangular or substantially rectangular. The second inner electrodes 12 preferably are parallel or substantially parallel to the first and second main surfaces 10a and 10b; the second inner electrodes 12 extend in or substantially in the length and width directions L and W. The first inner electrodes 11 and the second inner electrodes 12 are therefore parallel or substantially parallel to each other. The second inner electrodes 12 are exposed at the second end surface 10f and not at the first and second main surfaces 10a and 10b, the first and second lateral surfaces 10c and 10d, and the first end surface 10e.

The first and second inner electrodes 11 and 12 are interleaved and arranged in the thickness direction T. Each pair of first and second inner electrodes 11 and 12 adjacent in the thickness direction T face each other with a layer of a ceramic section 10g located therebetween. The thickness of each layer of the ceramic section 10g can be on the order of about 0.4 µm to about 0.8 µm, preferably on the order of about 0.3 µm to about 0.5 µm, for example. When the ceramic electronic component 1 is a capacitor, the thinner each layer of the ceramic section 10g is, the better for the capacitance of the ceramic electronic component 1.

As illustrated in FIG. 3, in the ceramic electronic component 1, the end portions of the first inner electrodes 11 in the width direction W are in the same or substantially the same positions in the width direction W as those of the second inner electrodes 12 in the width direction W. The end portions of the first and second inner electrodes 11 and 12 in the width direction W are within or substantially within the lateral surfaces 10c and 10d in the width direction W. The outermost portion of the ceramic body 10 in the width direction W is therefore a protective section 10h, to which the first and second inner electrodes 11 and 12 do not extend. The protective section 10h does not contribute to the functions of the multilayer ceramic electronic component 1. Thus, the thinner the protective section 10h is, the better for the performance of the multilayer ceramic electronic component 1. For example, when the multilayer ceramic electronic component 1 is a ceramic capacitor, reducing the thickness of the protective section 10h maximizes the area where the two sets of inner electrodes face each other, thus increasing the electrostatic capacitance of the capacitor. However, it is not advisable to make the protective section 10h too thin or leave no protective section 10h because this would affect the overall humidity resistance, i.e., this would make moisture in the air more likely to become located between the first inner electrodes 11 and the second inner electrodes 12.

More preferably, the dimension of the protective section 10h in the width direction W is on the order of about 2 µm to about 30 µm, for example.

The first and second inner electrodes 11 and 12 can be made of any suitable conductive material. Examples of materials that can be used to make the first and second inner electrodes 11 and 12 include metals such as Ni, Cu, Ag, Pd, and Au and alloys that contain at least one of Ni, Cu, Ag, Pd, and Au, such as Ag—Pd alloys.

As illustrated in FIGS. 1, 2, 4, and 5, the multilayer ceramic electronic component 1 includes first and second outer electrodes 13 and 14. The first outer electrode 13 is, as illustrated in FIGS. 2 and 4, electrically coupled to the first inner electrodes 11 on the first end surface 10e. The second outer electrode 14 is, as illustrated in FIGS. 2 and 5, electrically coupled to the second inner electrodes 12 on the second end surface 10f.

As illustrated in FIGS. 1, 2, 4, and 5, the first outer electrode 13 extends over an area extended from the first end surface 10e to the first and second main surfaces 10a and 10b and the first and second lateral surfaces 10c and 10d. The second outer electrode 14 extends over an area extending from the second end surface 10f to the first and second main surfaces 10a and 10b and the first and second lateral surfaces 10c and 10d.

The first and second outer electrodes 13 and 14 can be made of any suitable conductive material. It is also possible that each of the first and second outer electrodes 13 and 14 includes two or more conductive films.

In this preferred embodiment, the detailed structure of the first and second outer electrodes 13 and 14 is as follows. Each includes a substrate layer and one or more plating layers on the substrate layer. The substrate layer is on the first or second end surface 10e or 10f.

The substrate layer can be, for example, a sintered metal layer, a plating layer, or a conductive resin layer made of a conductive resin obtained by adding a conductive filler to a thermosetting or light-curable resin. When a sintered metal layer is used, the sintered metal layer can be obtained by co-firing, i.e., firing the material for the metal layer together with the first and second inner electrodes 11 and 12, or by post-firing, i.e., applying a conductive paste and then firing the applied conductive paste.

The conductive material contained in the substrate layer can be of any kind. Specific examples of conductive materials that can be contained in the substrate layer include metals such as Cu, Ni, Ag, Pd, and Au and alloys that contain at least one of such metals, such as Ag—Pd.

The maximum thickness of the substrate layer can be on the order of about 20 µm to about 100 µm, for example.

As for the plating layer(s), examples of materials that can be used include metals such as Cu, Ni, Sn, Ag, Pd, and Au and alloys that contain at least one of such metals, such as Ag—Pd.

The maximum thickness of the plating layer or each of the plating layers can be on the order of about 1 µm to about 10 µm, for example.

There may also be a stress-relaxation resin layer between the substrate layer and the plating layer(s).

Figure 6:
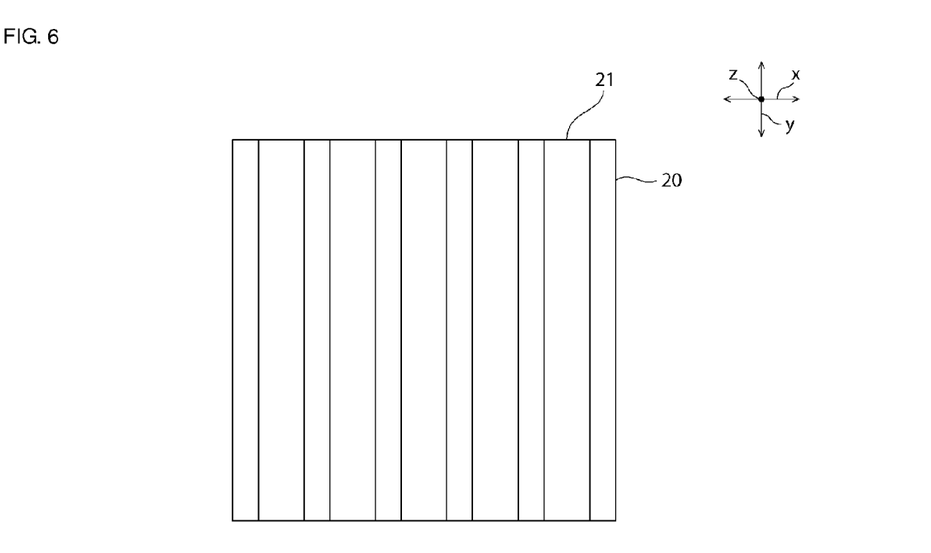
FIG. 6 is a schematic plan view of a ceramic green sheet and a conductive paste printed thereon.
Figure 7:
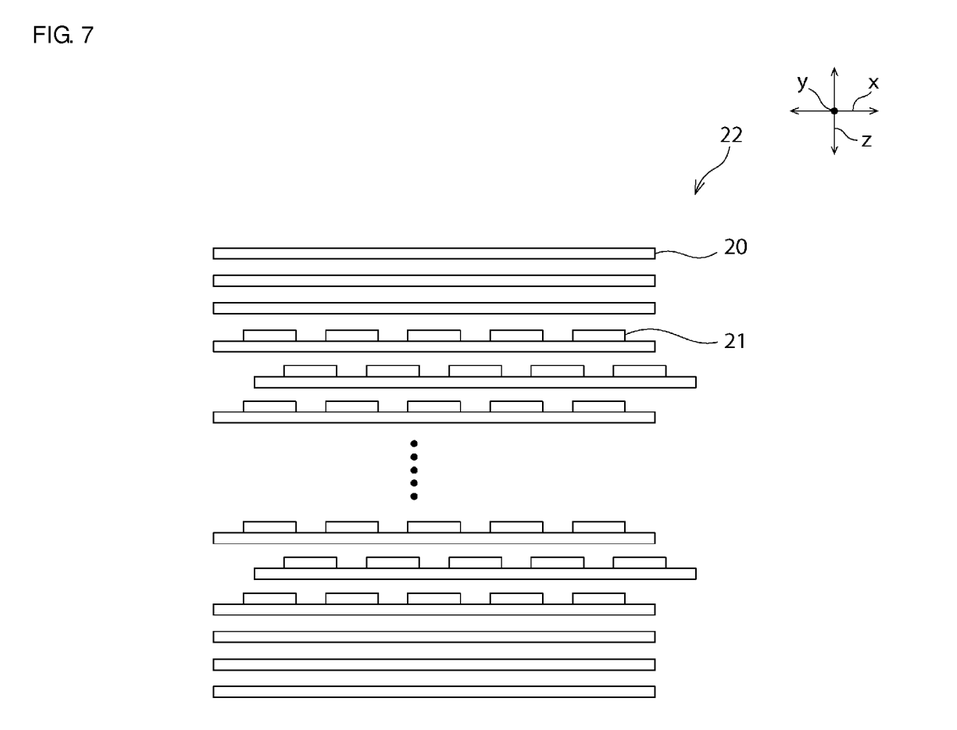
FIG. 7 is a schematic exploded side view of stacked ceramic green sheets.
Figure 8:
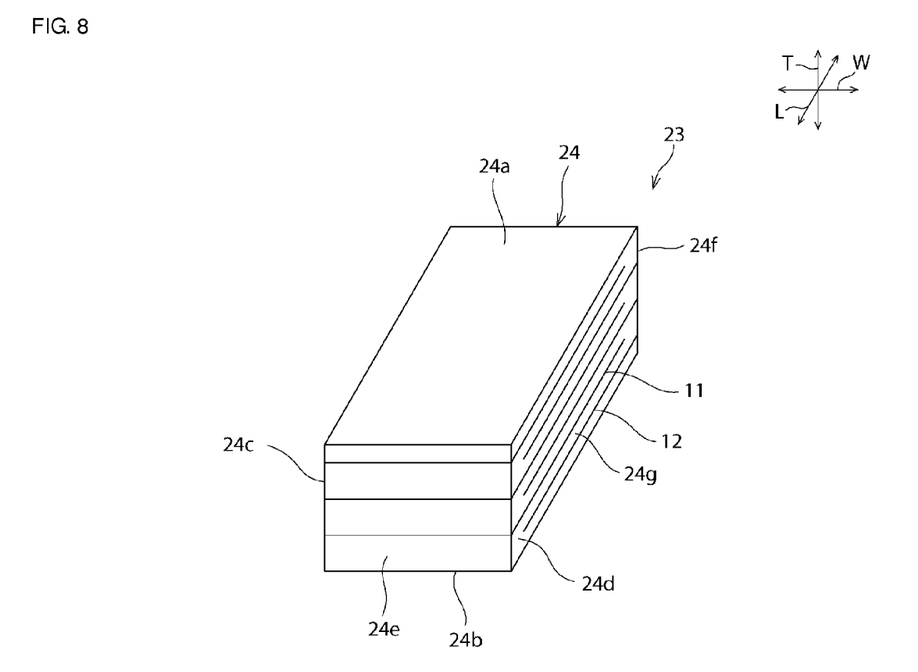
FIG. 8 is a schematic perspective view of a raw ceramic body 23.
Figure 9:
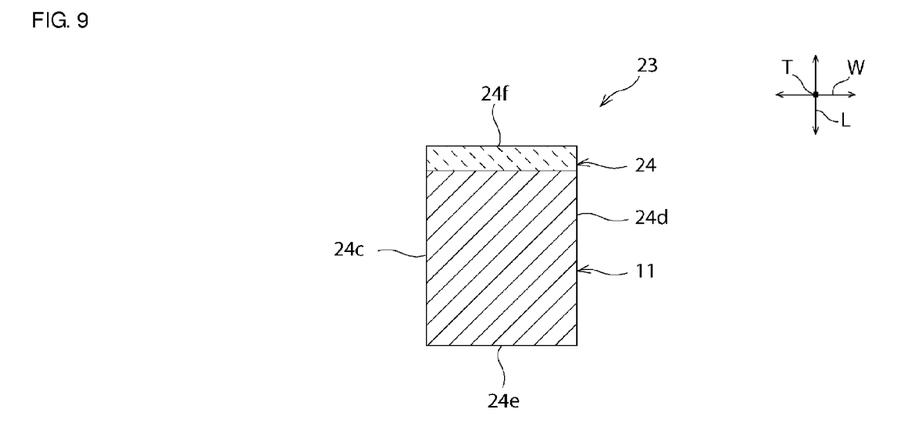
FIG. 9 is a schematic cross-sectional view of the raw ceramic body 23.
Figure 10:
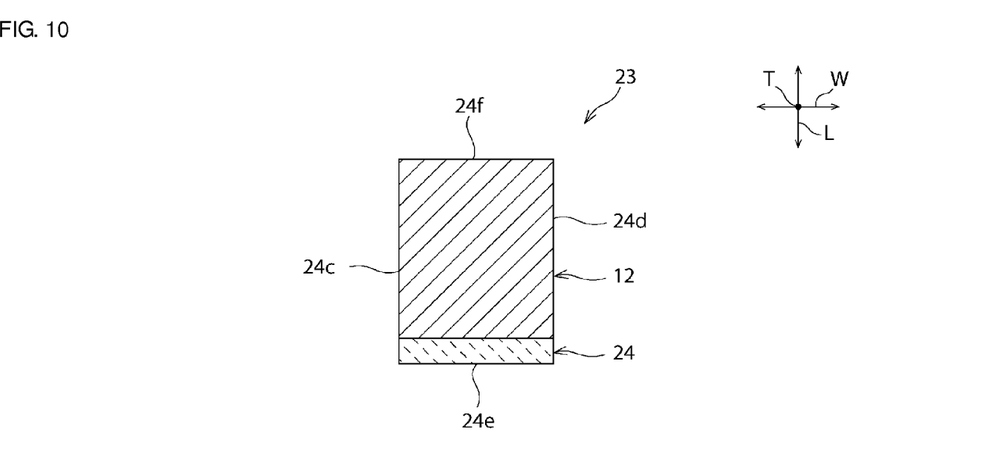
FIG. 10 is another schematic cross-sectional view of the raw ceramic body 23.
Figure 11:
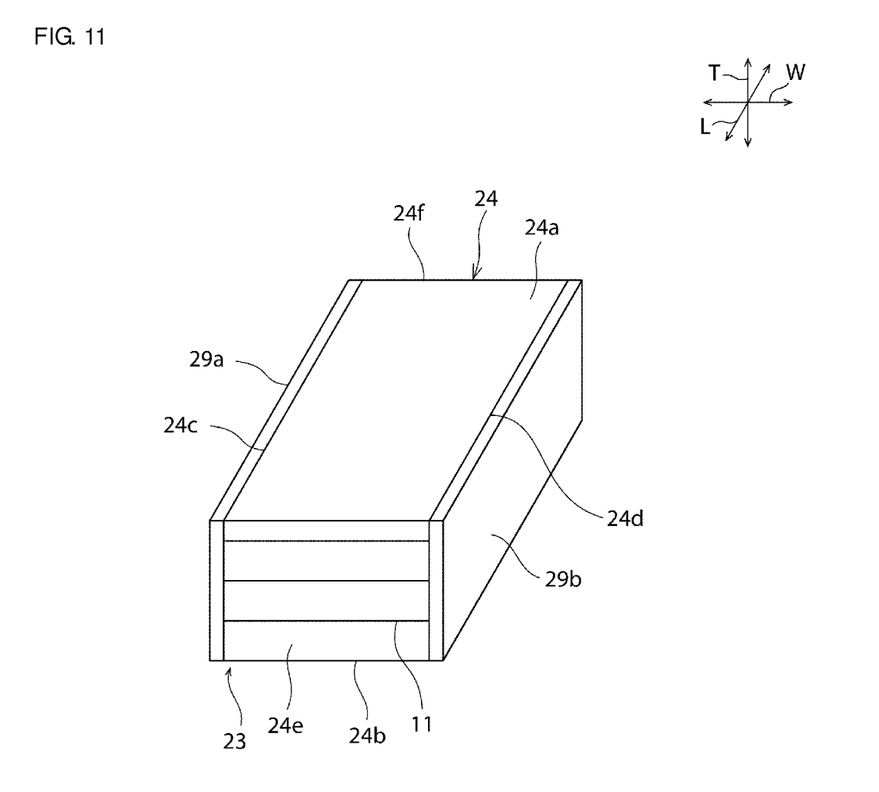
FIG. 11 is another schematic perspective view of the raw ceramic body 23.

FIG. 6 is a schematic plan view of a ceramic green sheet and a conductive paste printed thereon. FIG. 7 is a schematic exploded side view of stacked ceramic green sheets. FIG. 8 is a schematic perspective view of a raw ceramic body 23. FIGS. 9 and 10 are schematic cross-sectional views of the raw ceramic body 23 FIG. 11 is another schematic perspective view of the raw ceramic body 23.

The following describes a non-limiting example of a method for manufacturing the multilayer ceramic electronic component 1 according to another preferred embodiment of the present invention, mainly with reference to FIGS. 6 to 11.

First, $BaCO_3$, $TiO_2$, and $CaCO_3$ powders are prepared. Each of the powders has a purity of at least about 99% by weight. These powders are calcined in the air at a temperature on the order of 1100° C. to 1300° C. for about 2 hours to form a perovskite compound that contains Ba, Ti, and Ca. The obtained material is then disintegrated into a ceramic powder, which is the main powder, i.e., the main component of the ceramic green sheets used in this method. The main powder can be prepared by various known methods such as the solid-phase process and the hydrothermal process. It is also possible that the main powder is made of a Ba- and Ti-containing perovskite compound obtained using $BaCO_3$ and $TiO_2$ powders. The starting compounds for the main powder can be in any suitable form; starting compounds including carbonates, oxides, hydroxides, and chlorides can be used. The main powder may also contain inevitable impurities such as $HfO_2$. Then dopants, i.e., a glass or Si powder and at least one powder as a source of at least one constituent selected from Ba, Mg, Mn, and a rare-earth element, are prepared and mixed with the main powder. Another portion of the ceramic powder, which is to form the protective section 10h, is mixed with the aforementioned dopants to form a powder dielectric in which the total molar ratio of the constituent(s) selected from Ba, Mg, Mn, and a rare-earth element to the Ti in the perovskite compound is greater than that in the ceramic powder for the ceramic section 24g. The constituent(s) selected from Ba, Mg, Mn, and a rare-earth element is not necessarily added in the form of a dopant; it is possible that a compound that contains this constituent(s), glass or Si, and optionally other elements is prepared first and then this compound is mixed with the ceramic powder.

Preferably, the ceramic powders are core-shell ceramic powders so that the dopant constituent(s) becomes more effective in limiting the growth of ceramic particles.

Several green sheets 20 (see FIG. 6) for building the ceramic body 10 are then prepared. The ceramic green sheets 20 can be prepared by the following method, for example. First, the powder dielectric, a dispersion medium, and optionally a binder and other ingredients are mixed to form a ceramic paste. The ceramic paste is printed on a film such as a resin film to form a sheet. The obtained sheet is then dried; the dried sheet can be used as a ceramic green sheet 20. Examples of printing methods that can be used to print the ceramic paste include die coating, gravure coating, and the Microgravure coating method.

In this preferred embodiment, the thickness of each ceramic green sheet 20 preferably is about 1.5 μm or less, for example, so that each layer of the ceramic section 10g can be thin and, therefore, that the resulting multilayer ceramic capacitor can have a large capacitance.

Conductive films 21 for forming the inner electrodes 11 and 12 are then formed on some of the ceramic green sheets 20. More specifically, several conductive films 21 are printed with a space therebetween in direction x to draw a pattern including stripes, for example. Examples of printing methods that can be used to print the conductive films 21 include screen printing, ink jet printing, and gravure printing. The thickness of the conductive films 21 can be about 1.5 μm or less, for example.

Then, as illustrated in FIG. 7, some ceramic green sheets 20 that have no conductive films 21 are stacked, and some ceramic green sheets 20 that have the conductive films 21 are stacked so that every other sheet is offset in direction x, which is perpendicular to the direction where the conductive films 21 extend, i.e., direction y. Some ceramic green sheets 20 that have no conductive films 21 are then stacked to complete a ceramic green sheet laminate 22. If necessary, the ceramic green sheet laminate 22 may be hydrostatically compressed in the thickness direction z.

The ceramic green sheet laminate 22 is then divided into several pieces, i.e., raw ceramic bodies 23. FIGS. 8 to 10 illustrate one raw ceramic body 23. In this way, raw ceramic bodies 23 are prepared.

Each of the raw ceramic bodies 23 includes a substantially cuboid ceramic main body 24. The ceramic main body 24 includes first and second main surfaces 24a and 24b, first and second lateral surfaces 24c and 24d, and first and second end surfaces 24e and 24f. The first and second main surfaces 24a and 24b extend in the length and width directions L and W. The first and second lateral surfaces 24c and 24d extend in the length and thickness directions L and T. The first and second end surfaces 24e and 24f extend in the width and thickness directions W and T.

The ceramic main body 24 contains ceramic particles and at least one constituent selected from a Ba-containing compound, a Mg-containing compound, a Mn-containing compound, and a compound that contains a rare-earth element.

The ceramic main body 24 includes first and second inner electrodes 11 and 12, both made from the conductive films 21. The first inner electrodes 11 are parallel or substantially parallel to the first and second main surfaces 24a and 24b. The first inner electrodes 11 are exposed at the first end surface 24e and the first and second lateral surfaces 24c and 24d. The first inner electrodes 11 are not exposed at the second end surface 24f.

Likewise, the second inner electrodes 12 are parallel or substantially parallel to the first and second main surfaces 24a and 24b. The second inner electrodes 12 are exposed on the second end surface 24f and the first and second lateral surfaces 24c and 24d. The second inner electrodes 12 are not exposed at the first end surface 24e. Each pair of first and second inner electrodes 11 and 12 face each other in the thickness direction T with a layer of a ceramic section 24g located therebetween.

Then, as illustrated in FIG. 11, a ceramic layer 29a is located on the first lateral surface 24c, and a ceramic layer 29b is located on the second lateral surface 24d. In this way, a raw ceramic body 23 is obtained that includes a raw ceramic main body 24 and two ceramic layers 29a and 29b.

The ceramic layers 29a and 29b define the protective section 10h. The ceramic layers 29a and 29b contain ceramic particles and more of the constituent(s) between the ceramic particles than the ceramic main body 24 (ceramic section 24g).

The constituent(s) between the ceramic particles in the ceramic main body 24 is selected from Ba, Mg, Mn, and a rare-earth element, for example.

The ceramic layers 29a and 29b can be formed by any suitable method. For example, the ceramic layers 29a and 29b can be formed by attaching a ceramic green sheet to each of the lateral surfaces 24c and 24d. The ceramic layers 29a and 29b can also be formed by applying a ceramic paste that contains ceramic particles.

The raw ceramic body 23 is then fired to complete a main body 9 that includes a ceramic body 10, which is left after the raw ceramic body 23 is fired, and the first and second inner electrodes 11 and 12. The protective section 10h is formed by the ceramic layers left after the ceramic layers 29a and 29b are fired. During firing, the dopant constituent(s), selected from Ba, Mg, Mn, and a rare-earth element, forms a compound with glass or other elements located between ceramic particles.

The temperature at which the raw ceramic body 23 is fired can be on the order of about 1000° C. to about 1300° C., for example.

Finally, the first and second outer electrodes 13 and are formed to complete the multilayer ceramic electronic component 1. The first and second outer electrodes 13 and 14 can be formed by applying a conductive paste and then firing the applied paste or by a plating process, for example.

In this preferred embodiment, therefore, the ceramic layers 29a and 29b contain ceramic particles and more of the constituent(s) between the ceramic particles selected from a Ba-containing compound, a Mg-containing compound, a Mn-containing compound, and a compound that contains a rare-earth element than the ceramic main body 24 (ceramic section 24g). This prevents short-circuiting between the first inner electrodes 11 and the second inner electrodes 12, compared to the structure where the concentration of the constituent(s) between the ceramic particles is equal in the ceramic layers and the ceramic section, for example.

The short-circuiting between the first inner electrodes 11 and the second inner electrodes 12 can be attributed to the following reason. While the raw ceramic body is fired, liquid-phase sintering occurs between the ceramic particles that form the raw ceramic body. During liquid-phase sintering, heat travels from the outer side portion of the raw ceramic body toward the inner side portion. The superficial portion of the raw ceramic body is therefore at a high temperature for a longer period of time than the deeper portion; the middle portion of the raw ceramic body should be maintained at a temperature suitable for sintering for long enough that the middle portion of the raw ceramic body can be satisfactorily sintered. This means that oversintering is likely to occur in the superficial portion of the raw ceramic body. Oversintering in a portion causes the ceramic particles to outgrow and ceramic particles that have a large particle diameter to predominate in that portion. As the ceramic particles outgrow, the center-to-center distance between adjacent ceramic particles increases. The inner electrodes, which are formed on such ceramic particles, are stretched while the ceramic particles grow. Eventually, the inner electrodes break and lose continuity. During firing, the inner electrodes are in the form of melt; once the inner electrodes break, the melted fragments of the electrodes form a spherical shape to lower the surface energy. As a result, the fragments of the inner electrodes become thicker.

Allowing the ceramic body to cool with such thickened fragments of the inner electrodes therein leads to thick inner electrodes being formed. Since the total thickness of the ceramic body is limited, the layers of the ceramic section become thinner, sandwiched between the thickened inner electrodes. As a result, the insulation between the first inner electrodes and the second inner electrodes is reduced. Furthermore, the variation in thickness between the individual layers of the ceramic section becomes greater as the ceramic particles in these layers grow. Insulation is also affected between the first and second inner electrodes located where the layer of the ceramic section is thin. These situations seemingly cause short-circuiting between the first inner electrodes and the second inner electrodes.

In this preferred embodiment, the ceramic layers 29a and 29b contain more of the constituent(s) between the ceramic particles selected from Ba, Mg, Mn, and a rare-earth element than the ceramic main body 24 (ceramic section 24g). The constituent(s) between the ceramic particles in these layers also diffuses into the superficial portion of the ceramic main body 24. The end portions of the ceramic section 24g in the width direction W therefore contain a high concentration of this constituent(s). In other words, the ceramic particles in the end portions of the ceramic section 24g in the width direction W have a high liquidus temperature, i.e., require a high temperature to be densified. As a result, the ceramic particles in the end portions of the ceramic main body 24 in the width direction W are sintered slowly and, therefore, grow slowly. The increase in the particle diameter of the ceramic particles in the end portions of the ceramic section 24g in the width direction W is thus controlled, and this makes the inner electrodes 11 and 12 less likely to break and, therefore, makes the inner electrodes 11 and 12 less likely to enlarge or expand in the thickness direction T, ensuring dense packing of ceramic particles. This makes this preferred embodiment effective in preventing short-circuiting between the first inner electrodes 11 and the second inner electrodes 12.

For more effective prevention of short-circuiting between the first inner electrodes 11 and the second inner electrodes 12, it is preferred that the ceramic layers 29a and 29b contain more of the constituent(s) between the ceramic particles than the ceramic section 24g in terms of total amount.

In the ceramic electronic component 1 manufactured in this preferred embodiment, the end portions of the ceramic section 24g, which is located between the first inner electrodes 11 and the second inner electrodes 12, in the width direction W contain more of the constituent(s) between the ceramic particles selected from Ba, Mg, Mn, and a rare-earth element than the middle portion of the ceramic body 10 (the middle portion of the ceramic section 10g in the width direction W) in terms of total amount. Furthermore, the ceramic layers 29a and 29b contain more of the constituent(s) between the ceramic particles selected from Ba, Mg, Mn, and a rare-earth element than the end portions of the ceramic section 24g, which is located between the first inner electrodes 11 and the second inner electrodes 12, in the width direction W in terms of total amount. More specifically, in the portion of the ceramic body 10 outside the first and second inner electrodes 11 and 12 in the width direction W and the portion where the end portions of the first and second inner electrodes 11 and 12 in the width direction W are located, the total amount of the constituent(s) between the ceramic particles selected from Ba, Mg, Mn, and a rare-earth element gradually decreases from the outer side portion of the ceramic body 10 in the width direction W toward the inner side portion. Such a multilayer ceramic electronic component 1 can be manufactured with a low risk of short-circuiting defects between the first and second inner electrodes 11 and 12.

In this preferred embodiment, furthermore, the distance between adjacent first and second inner electrodes 11 and 12 is long in the end portions of the region defined by the first and second inner electrodes 11 and 12 in the width direction W, which ensures that the ceramic section 10g is dense.

Incidentally, the amount of the constituent(s) between the ceramic particles selected from Ba, Mg, Mn, and a rare-earth element can be measured by the following method, for example.

First, the chip is ground in the length direction L until the middle portion is reached and a cross-section extending along the width and thickness directions W and T is exposed. The polished surface may be etched by ion milling or a similar technique. The exposed cross-section is then analyzed by EDX (energy-dispersive X-ray spectroscopy) where some portions that include boundaries between ceramic particles within the desired region of the cross-section, e.g., about 10 points each in the middle portion of the ceramic section in the width direction W, the end portions of the ceramic section in the width direction W, and the ceramic layers, are irradiated with an electron beam perpendicularly incident on the polished surface. The content of the constituent(s) between the ceramic particles (at least one of Ba, Mg, Mn, and a rare-earth element) is measured at each point, and the mean can be used to determine the individual and total amounts of the constituent(s) selected from Ba, Mg, Mn, and a rare-earth element. The depth of penetration of the electron beam is adjusted so that the electron beam strikes only boundaries between ceramic particles.

EXAMPLE

One hundred (100) multilayer ceramic electronic components equivalent to the multilayer ceramic electronic component 1 according to Preferred Embodiment 1 were manufactured by a method according to Preferred Embodiment 1 under the following conditions:

Basic composition of the ceramic main body 24 and the ceramic layers 29a and 29b, $BaTiO_3$;

Ba content in the ceramic main body 24 (Ba in ceramic particles excluded), 1.002;

Ba content in the ceramic layers 29a and 29b (Ba in ceramic particles excluded), 1.022;

The number of inner electrodes stacked, 510; Thickness of each layer of the ceramic section (design value), 0.5 µm;

Material used to make the inner electrodes, Ni; Thickness of each inner electrode (design value), 0.4 µm;

Distance between the first main surface and the first or second inner electrode closest to the first main surface in the thickness direction T, 30 µm (design value);

Thickness of the ceramic layers, 25 µm (design value).

The molar ratio of the dopant Ba to the Ti in the perovskite compound in the ceramic layers 29a and 29b was 1.022 in the Example and 1.002 in the Comparative Example.

The molar ratio of the dopant Ba to the Ti in the perovskite compound in the ceramic section 24g was 1.002 in both the Example and the Comparative Example.

These molar ratios, 1.002 and 1.022, are values determined in sintered samples.

The samples produced in the Example were analyzed by the method described above for the concentration of Ba. The analysis confirmed that in the portion of the ceramic body 10 outside the first and second inner electrodes 11 and 12 in the width direction W and the portion where the end portions of the first and second inner electrodes 11 and 12 in the width direction W were located, the total amount of the constituent(s) between the ceramic particles selected from Ba, Mg, Mn, and a rare-earth element gradually decreased from the outer side portion of the ceramic body 10 in the width direction W toward the inner side portion.

In the Example, the distance between adjacent first and second inner electrodes 11 and 12 in the end portions of the region defined by the first and second inner electrodes 11 and 12 in the width direction W was 560 µm.

COMPARATIVE EXAMPLE

One hundred (100) samples were manufactured as in the Example except that the overall composition of the ceramic main body and that of the ceramic layers were the same or substantially the same.

In the Comparative Example, the distance between adjacent first and second inner electrodes in the end portions of the region defined by the first and second inner electrodes in width direction W was 550 µm, shorter than in the Example.

This means that in the Comparative Example the thickness of the layers of the ceramic section, sandwiched between the first inner electrodes and the second inner electrodes, was reduced in the end portions of the ceramic section in the width direction W.

The 100 samples produced in the Example and the 100 in the Comparative Example were inspected for short-circuiting defects. The samples produced in the Example included 10 defective samples, whereas those in the Comparative Examples included 20 defective samples.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a ceramic electronic component, the method comprising:
   preparing a raw ceramic body including:
      first and second main surfaces extending in length and width directions;
      first and second lateral surfaces extending in length and thickness directions;
      first and second end surfaces extending in width and thickness directions;
      a first inner electrode exposed at the first end surface and the first and second lateral surfaces; and
      a second inner electrode exposed at the second end surface and the first and second lateral surfaces;
      the first and second inner electrodes facing each other in the thickness direction with a ceramic section located therebetween, the ceramic section containing ceramic particles and at least one constituent selected from Ba, Mn, and a rare-earth element located between the ceramic particles;
   forming a raw ceramic portion on each of the first and second lateral surfaces of the raw ceramic body, the raw ceramic portions containing ceramic particles and more of the total amount content of the at least one constituent selected from Ba, Mn, and a rare-earth element located between the ceramic particles in the raw ceramic portions than that in the ceramic section; and
   obtaining the ceramic electronic component including an electronic component body left after the raw ceramic body is fired with the raw ceramic portions provided thereon, by firing the raw ceramic body with the raw ceramic portions provided thereon.

2. The method for manufacturing a ceramic electronic component according to claim 1, wherein the at least one constituent located between the ceramic particles is a rare-earth element.

3. The method for manufacturing a ceramic electronic component according to claim 1, wherein the at least one constituent located between the ceramic particles is selected from a Ba-containing compound, a Mn-containing compound, and a compound containing a rare-earth element.

4. The method for manufacturing a ceramic electronic component according to claim 1, wherein each of the raw ceramic portions is formed by attaching a ceramic green sheet.

5. The method for manufacturing a ceramic electronic component according to claim 1, wherein each of the raw ceramic portions is formed by applying a ceramic paste.

6. The method for manufacturing a ceramic electronic component according to claim 1, wherein a total amount content of the at least one constituent selected from Ba, Mn, and a rare-earth element gradually decreases from an outer side portion of the ceramic body toward an inner side portion of the ceramic body.

7. The method for manufacturing a ceramic electronic component according to claim 6, wherein the at least one constituent between the ceramic particles is a rare-earth element.

8. The method for manufacturing a ceramic electronic component according to claim 1, wherein end portions of the first inner electrode in the width direction are in the same or substantially the same positions in the width direction as end portions of the second inner electrode in the width direction.

9. The method for manufacturing a ceramic electronic component according to claim 1, wherein the ceramic particles in the ceramic body are made of a perovskite compound containing Ba and Ti or a perovskite compound containing Ba, Ti, and Ca.

10. The method for manufacturing a ceramic electronic component according to claim 1, wherein the at least one constituent between the ceramic particles is selected from a Ba-containing compound, a Mn-containing compound, and a compound containing a rare-earth element.

11. The method for manufacturing a ceramic electronic component according to claim 1, wherein:
an end portion of a region defined by the first and second inner electrodes on a first lateral surface side in the width direction is at a distance of about 2 μm to about 30 μm from the first lateral surface; and
an end portion of the region defined by the first and second inner electrodes on a second lateral surface side in the width direction is at a distance of about 2 μm to about 30 μm from the second lateral surface.

12. The method for manufacturing a ceramic electronic component according to claim 1, wherein the ceramic section has a thickness of about 0.4 μm to about 0.8 μm.

13. A ceramic electronic component comprising:
a ceramic body including:
first and second main surfaces extending in length and width directions;
first and second lateral surfaces extending in length and thickness directions; and
first and second end surfaces extending in width and thickness directions; and including:
ceramic particles; and
at least one constituent selected from Ba, Mn, and a rare-earth element located between the ceramic particles;
a first inner electrode extending in the ceramic body in the length and width directions and exposed at the first end surface;
a second inner electrode extending in the ceramic body in the length and width directions and exposed at the second end surface, the first and second inner electrodes facing each other in the thickness direction with a ceramic section located therebetween; wherein
end portions of the ceramic section, located between the first inner electrode and the second inner electrode, in the width direction contain more of the total amount content of the at least one constituent selected from Ba, Mn, and a rare-earth element contained in a compound present between the ceramic particles than that in a middle portion of the ceramic body in the width direction.

14. The ceramic electronic component according to claim 13, wherein a total amount content of the at least one constituent selected from Ba, Mn, and a rare-earth element gradually decreases from an outer side portion of the ceramic body toward an inner side portion of the ceramic body.

15. The ceramic electronic component according to claim 14, wherein the at least one constituent between the ceramic particles is a rare-earth element.

16. The ceramic electronic component according to claim 13, wherein end portions of the first inner electrode in the width direction are in the same or substantially the same positions in the width direction as end portions of the second inner electrode in the width direction.

17. The ceramic electronic component according to claim 13, wherein the ceramic particles in the ceramic body are made of a perovskite compound containing Ba and Ti or a perovskite compound containing Ba, Ti, and Ca.

18. The ceramic electronic component according to claim 13, wherein the at least one constituent between the ceramic particles is selected from a Ba-containing compound, a Mn-containing compound, and a compound containing a rare-earth element.

19. The ceramic electronic component according to claim 13, wherein:
an end portion of a region defined by the first and second inner electrodes on a first lateral surface side in the width direction is at a distance of about 2 μm to about 30 μm from the first lateral surface; and
an end portion of the region defined by the first and second inner electrodes on a second lateral surface side in the width direction is at a distance of about 2 μm to about 30 μm from the second lateral surface.

20. The ceramic electronic component according to claim 13, wherein the ceramic section has a thickness of about 0.4 μm to about 0.8 μm.

* * * * *